(12) United States Patent
Thomson et al.

(10) Patent No.: US 8,270,784 B2
(45) Date of Patent: Sep. 18, 2012

(54) WAVEGUIDE DEVICE

(75) Inventors: Robert Roderick Thomson, Edinburgh (GB); Henry Thomas Gibson Bookey, Stirling (GB); Nicholas David Psaila, Midlothian (GB); Ajoy Kumar Kar, Edinburgh (GB)

(73) Assignee: Heriot-Watt University, Edinburg (GB)

( * ) Notice: Subject to any disclaimer, the term of this patent is extended or adjusted under 35 U.S.C. 154(b) by 151 days.

(21) Appl. No.: 12/665,639

(22) PCT Filed: Jun. 19, 2008

(86) PCT No.: PCT/GB2008/002087
§ 371 (c)(1),
(2), (4) Date: Jan. 13, 2010

(87) PCT Pub. No.: WO2008/155548
PCT Pub. Date: Dec. 24, 2008

(65) Prior Publication Data
US 2010/0178007 A1   Jul. 15, 2010

(30) Foreign Application Priority Data
Jun. 19, 2007   (GB) .................................. 0711822.7

(51) Int. Cl.
*G02B 6/38* (2006.01)
*H01L 21/00* (2006.01)
(52) U.S. Cl. ................ 385/15; 385/27; 385/31; 385/39; 385/50; 385/51; 385/52; 385/55; 385/71; 385/73; 385/135; 438/29
(58) Field of Classification Search ............. 385/15–94, 385/135; 438/29
See application file for complete search history.

(56) References Cited

U.S. PATENT DOCUMENTS

| | | | | |
|---|---|---|---|---|
| 6,045,269 A | * | 4/2000 | Watanabe et al. | 385/59 |
| 6,049,646 A | * | 4/2000 | Boscher | 385/49 |
| 6,229,947 B1 | * | 5/2001 | Vawter et al. | 385/132 |
| 6,459,842 B1 | * | 10/2002 | Arsenault et al. | 385/134 |
| 7,500,789 B2 | * | 3/2009 | Grunberg et al. | 385/53 |
| 2002/0076655 A1 | * | 6/2002 | Borrelli et al. | 430/321 |
| 2003/0007754 A1 | | 1/2003 | Terashima | |
| 2003/0021536 A1 | * | 1/2003 | Sakuma et al. | 385/45 |
| 2003/0223681 A1 | * | 12/2003 | Frick | 385/23 |
| 2004/0114874 A1 | * | 6/2004 | Bono et al. | 385/53 |
| 2004/0258359 A1 | * | 12/2004 | Corkum et al. | 385/39 |
| 2005/0117846 A1 | * | 6/2005 | Amleshi et al. | 385/49 |
| 2006/0165341 A1 | * | 7/2006 | Yan et al. | 385/8 |
| 2006/0193579 A1 | * | 8/2006 | McLeod et al. | 385/120 |
| 2006/0215976 A1 | * | 9/2006 | Singh et al. | 385/126 |

* cited by examiner

*Primary Examiner* — Brian M. Healy
*Assistant Examiner* — Guy Anderson
(74) *Attorney, Agent, or Firm* — Alston & Bird LLP

(57) ABSTRACT

An optical adapter that is arranged to connect two or more optical devices that have different connector layouts, the optical adapter comprising a material through which a plurality of waveguides is formed, the waveguides defining a first connector configuration at one end or face of the material and a second connector configuration at another, or same end or face of the material.

19 Claims, 3 Drawing Sheets

WAVEGUIDE DEVICE

FIELD OF THE INVENTION

The present invention relates to an optical connector device and method of forming the same.

BACKGROUND OF THE INVENTION

Standard optical fibres confine light in a region of the fibre known as the core. The core region is generally placed in the centre of the fibre cross section. In recent years, fibres known as "multicore" fibres (MCFs) have been developed for various applications including sensing and lasers. In contrast to standard fibres, MCFs contain numerous cores that are situated throughout the fibre cross section. Depending on the application, the core regions may be separated by as little as a few microns and can be arranged in either a one dimensional or two dimensional array.

Due to the core geometries of MCFs, the coupling of light into and out of each core can pose a significant problem. In the case of MCFs consisting of a one-dimensional array of cores, the coupling issues, although challenging, can be overcome through the use of known optical devices. However, significantly greater problems currently exist when coupling light to and from MCFs that have a two dimensional array of cores.

Currently, only three methods are known to potentially allow direct MCF to single core fibre coupling. The first is a theoretical proposal described by S. B. Poole and J. D. Love [Electron Lett., 27, 1559-1560 (1991)]. In this, the ends of two lengths of single core fibre are inserted into a hollow capillary. This capillary is then heated and tapered down to enclose the fibre ends within. By correctly controlling the fabrication, the separation of the fibre cores at the end of the taper can be controlled to match the core geometry of the MCF. As a result, light from the MCF can be directly coupled from the tapered end of the standard single core fibres to the MCF. A problem with this is that correctly shaped hollow capillaries have to be used to place the fibres, which limits the device that could be fabricated.

The second known method to allow direct MCF to single core fibre coupling involves creating a device by etching standard optical fibres using hydrofluoric acid, and then attempting to arrange them into the same spatial geometry as the core geometry of the MCF by using a frame or capillary into which the fibres are inserted, as described by G. M. H. Flockhart et al [Opt. Lett. 28, 387-389 (2003)]. A problem with this is that the fibres are extremely fragile after etching and the method involves the use of toxic substances. Furthermore, the core geometries for which a suitable device could be fabricated are limited since correctly shaped hollow capillaries have to be used to place the fibres.

The third technique involves fusion splicing a single core fibre directly to an MCF. Coupling between the single core fibre and the MCF is then achieved by tapering the fibre in the region of the fusion splice using a heat source, as described by L. Yuan et al [Appl. Optics. 47, 3307-3312 (2008)]. This technique is therefore only suitable currently for simultaneously addressing all cores of an MCF with a single core fibre and involves the fabrication of a taper, which may be extremely fragile.

SUMMARY OF THE INVENTION

According to one aspect of the present invention, there is provided an optical adapter that is arranged to connect two or more optical devices that have different connector layouts, the optical adapter comprising a material through which a plurality of waveguides is formed, the waveguides defining a first connector configuration at one end or face of the material and a second connector configuration at another or the same end or face of the material.

By forming waveguides through a single piece of connector material, there is provided a simple and effective technique for coupling even complex MCFs to other optical devices that have different input/output configurations. Because the waveguides are formed within the material of the adapter itself, so providing a single adapter element, the adapter can be fabricated to be extremely rugged and reliable. This presents a novel and integrated solution to problems which currently arise when light is to be transferred between standard single core fibres and an MCF with a two dimensional array of cores.

For most applications it is desirable to terminate the waveguides at the external facet of the connector device. However, for some high power or pulsed laser applications it may be beneficial to terminate the waveguide inside the substrate since the threshold for optical breakdown is lower at the air/substrate interlace.

The waveguides may define a 1D-connector-array at one end or face of the adapter and a 2D array connector array at the other end or face.

Alternatively, the waveguides may define a 2D-connector array having a first configuration at one end or face of the adapter and a 2D-connector array having a second configuration at the other end or face.

Alternatively, the waveguides may define a 1D-connector array having a first configuration at one end or face of the adapter and a 1D-connector array having a second configuration at the other end or face.

The first connector configuration and the second connector configuration may have different numbers of waveguides. For example, the first configuration may have n connector waveguides and the second configuration may have m connector waveguides, where n and m are integers and n is greater than m.

As a more specific example, the first configuration may have three waveguides for coupling light to and/or from a three core MCF and the second configuration may have a single waveguide into which the three waveguides of the first configuration feed for coupling light to and/or from a single optical fibre.

One or more or all of the waveguides may have a constant cross section, so that the input/output that is presented to the devices that are to be coupled to is the same size.

One or more or all of the waveguides may have a cross section that varies along its length. For example, one or more of the waveguides may be tapered along its length, so that the input/output at the first configuration is a different size and/or shape to that at the second configuration.

At least one of the waveguides may be shaped so that it supports only a single mode at the first configuration but multiple modes at the second configuration.

The adapter may be made of any suitable material, for example, a dielectric such as a plastic, a glass and a crystal or a semiconductor such as silicon, ZnSe, GaAs.

The adapter may be arranged to couple light between components such as MCFs, single optical fibres, waveguides, light paths, light emitters or collectors, or similar, the components being arranged in any geometry.

Preferably, the waveguides are formed using a laser, so that they are an integrated part of the adapter, wholly encapsulated within it. An advantage of this is that the radiation can be accurately controlled, which means that the geometries of the inputs/outputs of the adapter and those of the devices that are to be connected can be accurately matched, both in terms of position and possibly shape. Also, the laser radiation can be used to form even complex three-dimensional paths, so that there is significant design flexibility. Typically, this is done under computer control in accordance with a predetermined design.

Where laser radiation is used to define the waveguides, any material whose refractive index properties can be varied through the application of laser radiation could be used. In a preferred embodiment, ultrashort pulses of sub-bandgap radiation are used.

According to another aspect of the invention, there is provided a method for creating an adapter for connecting two or more optical devices that have different connector layouts, the method comprising using a laser to define a plurality of waveguides in an optical material, the waveguides defining a first connector configuration at one end or face of the material and a second connector configuration at another or the same end or face of the material.

The laser radiation may be emitted as pulses, more preferably, ultrashort pulses. Additionally or alternatively, the laser radiation may be sub-bandgap radiation.

The laser radiation may be focused inside the material in which waveguides are to be written.

The laser radiation may be provided using a suitable laser system, for example a cavity dumped laser oscillator, a master-oscillator-power-amplifier (MOPA) fibre laser source or a regeneratively amplified laser system.

BRIEF DESCRIPTION OF THE DRAWINGS

Various aspects of the invention will now be described by way of example only and with reference to the embodiments shown in the accompanying drawings in which.

SPECIFIC DESCRIPTION OF THE DRAWINGS

Figure 1A:
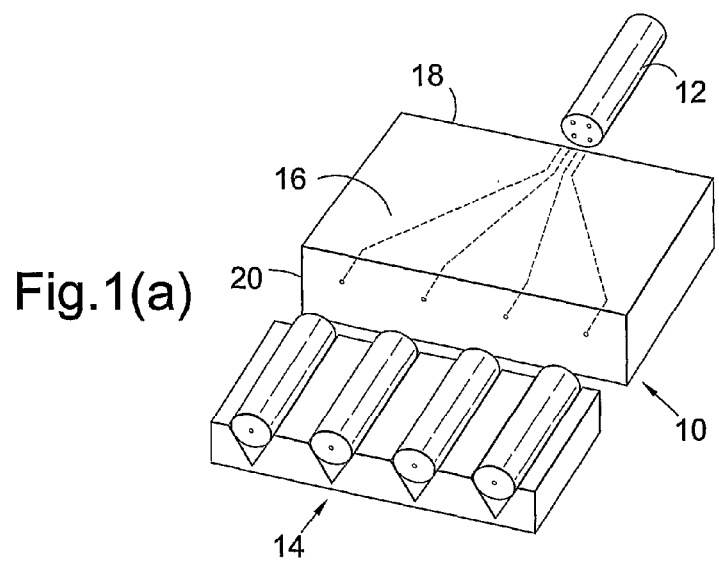
FIGS. 1(a), 1(b) and 1(c) show waveguide adapters for coupling light between optical devices that have different input/output configurations.

FIG. 1(a) shows a waveguide device 10 for coupling light between an MCF 12 having cores in a 2 by 2 geometry and a standard fibre V-groove array (FVA) 14 having a 1D geometry. The waveguide device 10 is a block of material, for example, a silica glass slide, through which a plurality of waveguides 16 is defined in the material itself. The waveguides 16 have slightly higher values of refractive index than that of the rest of the silica glass, so that total-internal-reflection occurs for light that enters the waveguides 16.

The device 10 of FIG. 1(a) has four waveguides 16, which at one side 18 are arranged in a 50 µm by 50 µm square to match the core arrangement of the MCF 12. The waveguides 16 'fan-out' in three dimensions while passing through the waveguide device 10 to the other side 20 to form a 1D connector arrangement with gaps between each waveguide of 250 µm, which matches the arrangement of cores in the FVA 14. Although not implicitly required nor shown in FIG. 1(a), in practice some form of adhesive or refractive index matching gel may be employed to connect the waveguide device and the MCF 48 and FVA 50.

When aligned, the waveguide device 10 can provide low loss coupling of light between the MCF 12 and the FVA 14. This is because each waveguide 16 is written specifically for optical components of specific geometries. This allows each core within the MCF 12 to be addressed individually, for MCFs of any core arrangement geometry. Experiments on the waveguide device 10 of FIG. 1(a) showed that there was a fibre-to-fibre insertion loss in the region of 5 dB, although it is anticipated that this value can be substantially lowered with further optimisation.

Figure 1B:
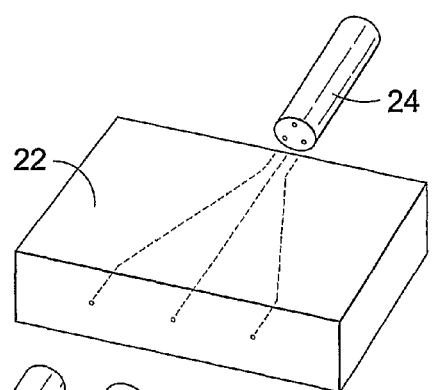

FIG. 1(b) shows another example of a 'fan-out' waveguide device 10 of the present invention. In this case, the waveguides 22 of the adapter device 10 have been formed to connect a 3-core MCF 24, in which the cores are arranged in an equilateral triangle with 70 µm sides, to a one-dimensional fibre array 26. Experiments on a waveguide device formed in this way showed a fibre-to-fibre insertion loss in the region of 3 dB, similar to the waveguide device of FIG. 1(b).

Figure 1C:
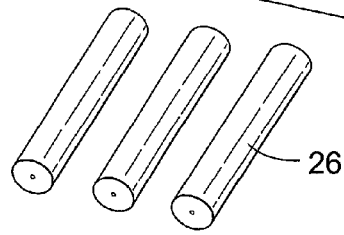
Figure 1C:
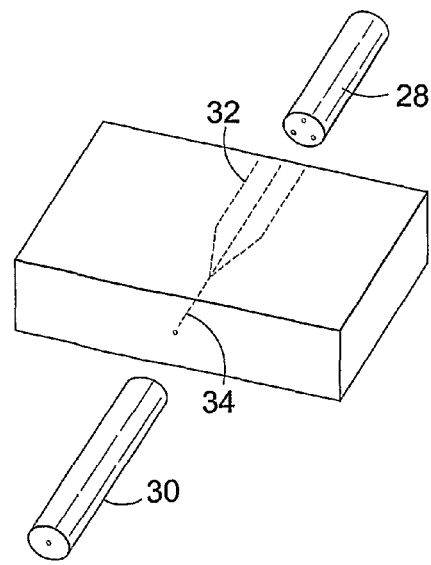

FIG. 1(c) shows another example of a connector 10 of the present invention. In this case, the waveguides of the adapter have been formed to connect a 3-core MCF 28, in which the cores are arranged in an equilateral triangle with 70 µm sides to a single fibre 30. To do this, a waveguide path 32 is defined for each core of the MCF. These three waveguides 32 are directed to the same area and combined into a single waveguide 34 that is positioned to match the single fibre 30. In this way the first coupling configuration that has three waveguides is transformed into a second coupling configuration having only a single waveguide.

In order to form the devices of FIGS. 1(a), (b) and (c), the geometry of waveguide paths is firstly defined. The desired start and end points, which are determined by the optical devices that are to be connected, are used as constraints. The waveguides preferably follow the path that results in the lowest propagation loss for the light. Usually, the waveguides do not intersect or merge, although this could be done if required, as shown in FIG. 1(c). Once the design is completed, the waveguides can be written into the material of choice.

Figure 2:
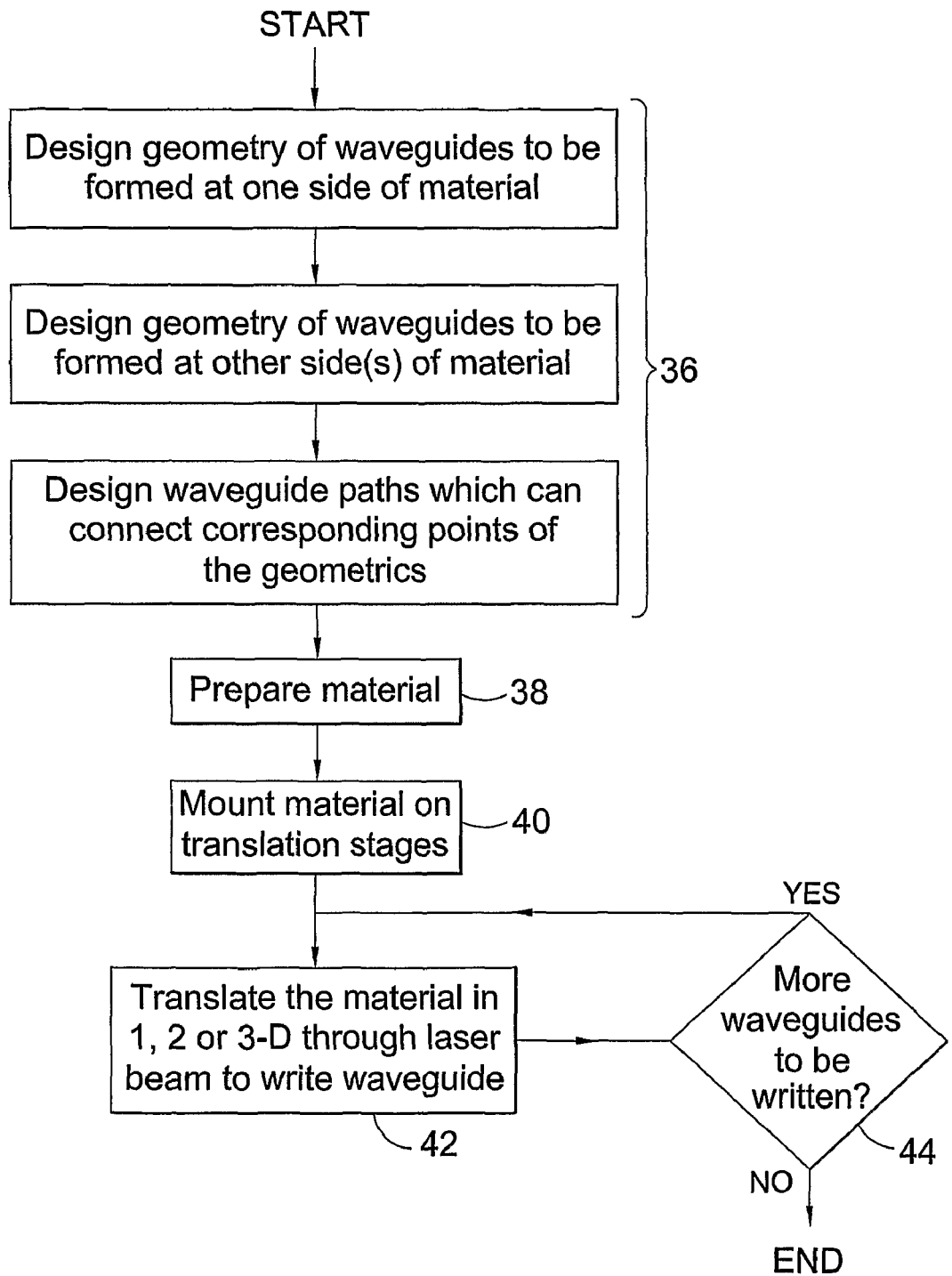
FIG. 2 is a flowchart of a method of waveguide writing for forming a device of the type shown in FIG. 1.

FIG. 2 shows a flowchart of a method for writing waveguides into a material to define the connector of FIG. 1. First the waveguide design is determined using the required configurations at the ends of the material, as described above 36. Then the material is prepared 38, typically using a standard cleaning process. In the current example, the material is a dielectric, for example a multi-component, predominantly silica glass slide (such as Menzel-Gläser Extra-white Electroverre-Glass). Next, the material is mounted 40 on a translation stage and a waveguide is written by translating the material in three dimensions through a focus of a laser beam. The translation path is defined by the required geometry. This process is repeated until all of the required waveguides have been formed.

Figure 3:
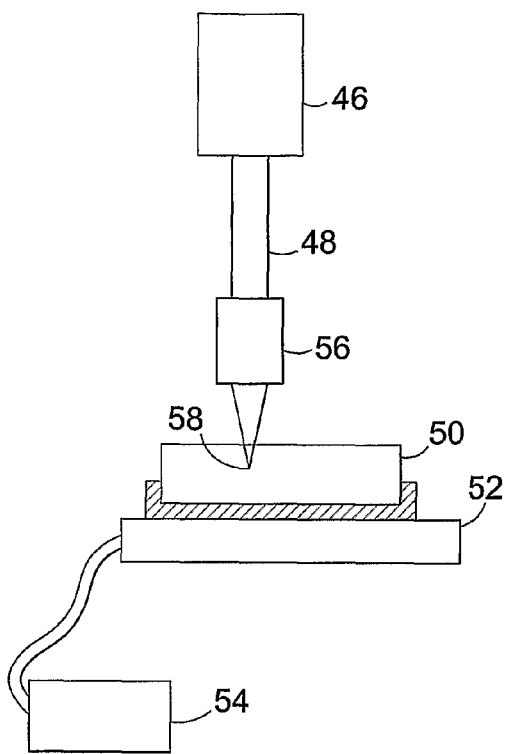
FIG. 3 is a diagram of writing equipment used in the method of FIG. 2.
Figure 4:
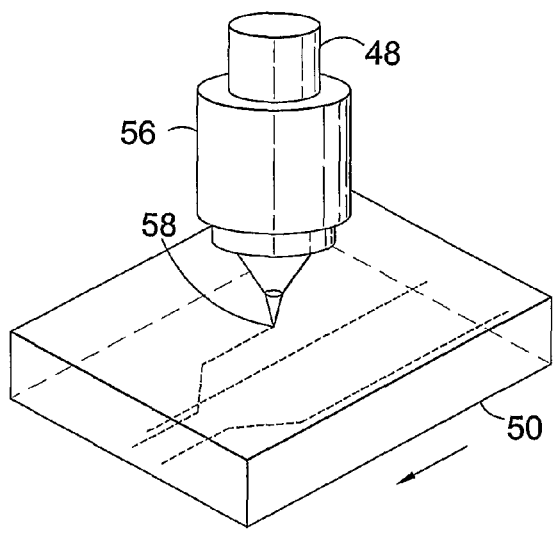
FIG. 4 is a diagram of the waveguide writing in progress.

FIGS. 3 and 4 show a laser system for implementing the method of FIG. 2. This has a laser system 46, for example a regeneratively amplified (RGA) Ti:Sapphire laser (Spectra-Physics Hurricane), for emitting a beam of laser radiation 48 for forming waveguides in a radiation sensitive material 50. In the arrangement shown in FIGS. 3 and 4, the material 50 is carried on a stage 52 that can be moved under the control of a computer based control unit 54 that is programmed to cause the pre-determined design to be written into the material 50. Beam 48 is focused onto the material 50 by a lens system 56, so that it reaches a focal point 58 at a point of the material 50 where a waveguide is to be formed. Due to highly nonlinear light-matter interaction, optical energy is deposited only in the material placed in the focal region. The deposited energy modifies the structure and refractive index of the material 50 at the focus 58, thus allowing the waveguides to be fabricated in a direct-write fashion. The use of this laser writing technique in other areas is described by, for example, K. M. Davis et al [Opt. Lett. 21, 1729 (1996)], the contents of which are incorporated herein by reference.

By moving the stage 52 in three-dimensions through the focus 58 (or alternatively moving the beam 48 so that the focus 58 is moved through the material 50) under computer control, even relatively complex waveguides can be formed extending from one side of the material 50 to the other. In FIG. 4, the translating path for forming the current waveguide is denoted by an arrow.

The beam 48 emitted by the laser system 46 is a linearly polarized train of 200 µJ pulses that have a pulse energy of 1.3 µJ and are emitted at a repetition rate of 5 kHz. In addition, at the output of the laser the pulse duration is approximately 130 fs full width half maximum (FWHM). These pulses are subsequently compressed to around 100 fs using an adaptive optics setup (not shown). After the pulse compression, the polarisation of the beam is adjusted to be circular. This is done to minimise propagation losses of signals that are to be guided through waveguides fabricated in this way. To facilitate low fibre-waveguide/waveguide-fibre coupling losses, the cross sectional shape of the fabricated waveguides is controlled using a slit method. Slit methods are widely known in the field of the present invention and may be employed as required.

During the writing process the laser beam pulses are focussed to a suitable depth, for example approximately 200 µm below the surface of the material 50. To inscribe waveguides at different depths inside the material the depth of the focussed spot inside the material must be changed by, for example, changing the distance between the material and the focusing lens. If the inscription process does not use an immersion lens to focus the beam inside the material, moving the material a distance "x" does not change the position of the focused spot by a distance "x" but approximately by a distance "x/n" where n is the refractive index of the material. This must be taken into consideration when calculating the paths that the material will be moved during the waveguide writing.

Overall, fabrication parameters (such as scan speed, pulse energy, pulse duration, polarisation, wavelength, laser repetition rate, scanning direction and focusing arrangement) should be optimised such that the overall insertion loss of the device is minimised for the specific application. This is done by considering the balance between the propagation losses (the sum of scattering, radiation and bend losses) of the inscribed waveguide and the coupling losses to and from the inscribed waveguide.

Propagation losses are minimised by reducing losses due to phenomena such as scattering, radiation, coupling to cladding modes and absorption. The size of the waveguide device should be optimised to minimise the overall propagation losses. This can be done by considering the relative contributions to the propagation losses from all mechanisms, in particular radiation and scattering. For example, if the device is too small, it may be necessary to inscribe waveguides with extremely small bend radii to interconnect the specified emitter/collector devices. This may induce high radiation losses that cancel the benefit of reducing the total losses due to scattering along a short waveguide.

Coupling losses are minimised by matching the spatial overlap and numerical aperture of transverse modes supported by the inscribed waveguide and the emitter/collector devices that are to be connected to the waveguide. The optimum fabrication parameters for each application and substrate material lie within an eight parameter dimensional space and the process of finding them is generally based on an iterative experimental process and careful optimisation.

By using the writing method described above, devices of a wide range of core arrangements can be produced, making the invention very flexible and suitable for coupling many different optical devices. For example, the connector of the invention could be used for to address many different optical sensors on one chip. In this case, light could be guided to (and from) each sensor on the chip from (and to) a fibre placed in a standard FVA. Equally, the connector of the invention may be suitable for addressing VCSEL arrays. For example, an optical interconnect could be produced that can connect between a 2 dimensional array of VCSELS (emitters) to a 1 dimensional array of fibres (collectors) for optical buses within optoelectronic devices.

The connector could also be used to address a cladding pumped multicore fibre. In this case, waveguides could be inscribed that both address the cores of the multicore fibre and address the cladding of the multicore fibre. The waveguides that address the cladding of the multicore fibre could be used to carry pump light. These waveguides could be terminated before the end of the inscribed coupling device such that the pump light emerging from the inscribed waveguide fills the aperture of the cladding of the multicore fibre and thus pumps the core of the multicore fibre efficiently.

The present invention provides a flexible means for coupling to and from components with a non-standard geometry by using a single element with integrally formed waveguides that can be designed to offer three-dimensional flexibility. This, in particular, solves the problem of how to couple light between 1D-array components and 2D-array components. The device of the invention is simple, sturdy, and quick to manufacture and provides an integrated solution that can be used, for example, to allow each core of an MCF to be addressed individually by a standard single core fibre.

Figure 5:
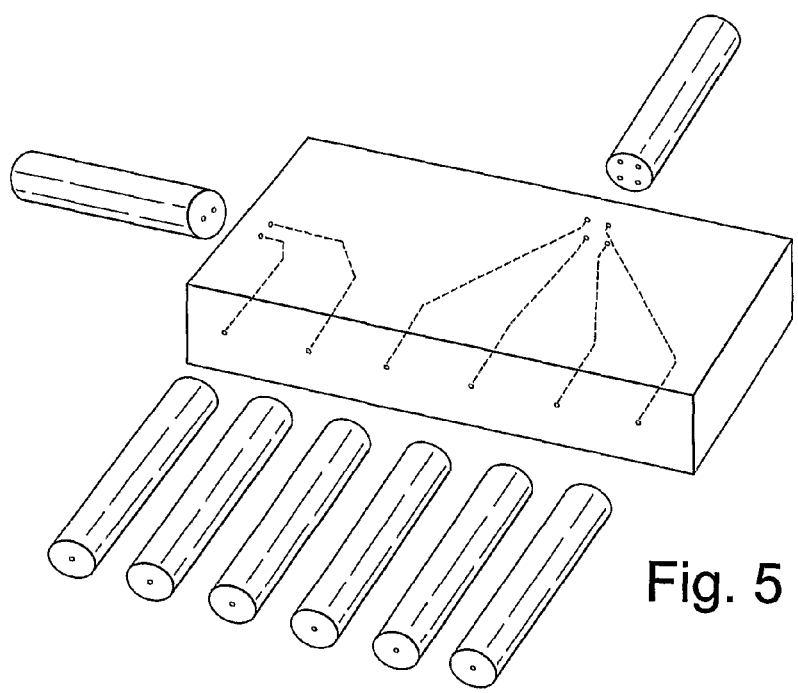
FIG. 5 is a diagram of another connector device, in this case adapted to connect multiple MCFs into an array of optical devices.

A skilled person will appreciate that variations of the disclosed arrangements are possible without departing from the invention. For example, although FIG. 1 shows a connector with waveguides that connect two opposing faces, the waveguides may be used to allow connections between three or more faces of the material, as shown in FIG. 5. Equally, the waveguides could be formed so as to define the first and second configurations on the same side or face of the adapter/connector. Accordingly the above description of the specific embodiment is made by way of example only and not for the purposes of limitation. It will be clear to the skilled person that minor modifications may be made without significant changes to the operation described.

The invention claimed is:

1. An optical adapter/connector that is arranged to connect two or more optical devices that have different connector layouts, the optical adapter comprising a material through which a plurality of waveguides is formed, the waveguides defining a first connector configuration at one end or face of the material and a second connector configuration at another or the same end or face of the material, wherein the first connector configuration is a one-dimensional array and the second connector configuration is a two-dimensional array.

2. An optical adapter as claimed in claim 1, wherein the material has a refractive index that can be varied using laser radiation and the waveguides are formed using a laser.

3. An optical adapter as claimed in claim 1 wherein the material is a dielectric or semiconducting material.

4. An optical adapter as claimed in claim 1 wherein the first connector configuration has more connecter waveguides than the second connector configuration.

5. An optical adapter as claimed in claim 1, wherein the first configuration is suitable for use with a fibre V-groove array (FVA) and the second configuration is suitable for use with a two-dimensional multicore fibre (MCF).

6. An optical adapter as claimed in claim 1 wherein the first connector configuration and the second connector configuration have different numbers of waveguides.

7. An optical adapter as claimed in claim 1 wherein the waveguides terminate at an external end or face of the adapter.

8. An optical adapter as claimed in claim 1 wherein at least one of the waveguides has a cross-section that varies along its length.

9. An optical adapter as claimed in claim 1 wherein at least one of the waveguides is shaped so that it supports only a single mode at the first configuration but multiple modes at the second configuration.

10. A method for forming an optical adapter comprising using a laser to define a plurality of waveguides in an optical material, the waveguides defining a first connector configuration at one end or face of the material and a second connector configuration at another end or face of the material, wherein the first connector configuration is a one-dimensional array and the second connector configuration is a two-dimensional array.

11. A method as claimed in claim 10 wherein the laser radiation is sub-bandgap radiation with respect to the material.

12. A method as claimed in claim 10 wherein the laser radiation is focussed and the waveguides are formed at the focal point of the radiation.

13. A method as claimed in claim 10 wherein the material is a dielectric or semiconductor material.

14. A method as claimed in claim 10 wherein the waveguides are defined in two or three dimensions.

15. A method as claimed in claim 10 wherein the laser radiation is pulsed.

16. A method as claimed in claim 15 wherein the pulses of radiation have a pulse energy of up to 1 mJ, for example between 1 nJ and 1000 µJ, as a further example between 0.1 µJ and 1000 µJ.

17. A method as claimed in claim 15 wherein ultrashort pulses of radiation are used.

18. A method as claimed in claim 17 wherein the ultrashort pulses have a full width half maximum duration of between 20 femtoseconds to 50 picoseconds.

19. A method as claimed in claim 10 wherein the laser radiation is provided by a regeneratively amplified (RGA) Ti:Sapphire laser system.

* * * * *